No. 863,692. PATENTED AUG. 20, 1907.
W. L. BLISS.
SYSTEM OF ELECTRICAL DISTRIBUTION.
APPLICATION FILED JULY 20, 1904.
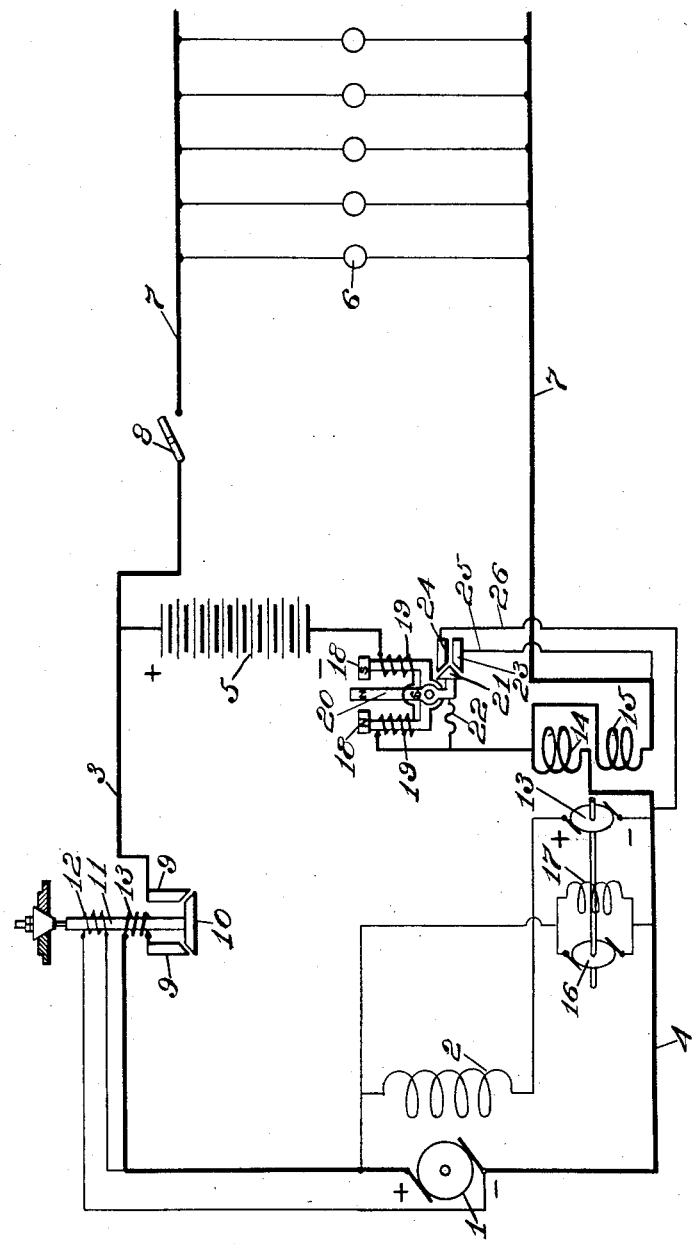
WITNESSES:
Herbert J. Smith
Edwin B. H. Towers, Jr.
INVENTOR.
William L. Bliss.
BY Jones & Addington
ATTORNEYS.

UNITED STATES PATENT OFFICE.

WILLIAM L. BLISS, OF NEW YORK, N. Y.

SYSTEM OF ELECTRICAL DISTRIBUTION.

No. 863,692.　　　　Specification of Letters Patent.　　　　Patented Aug. 20, 1907.

Application filed July 20, 1904. Serial No. 217,385.

*To all whom it may concern:*

Be it known that I, WILLIAM L. BLISS, a citizen of the United States, residing at New York, in the county of Kings and State of New York, have invented new and useful Improvements in Systems of Electrical Distribution, of which the following is a full, clear, concise, and exact description, reference being had to the accompanying drawing, forming a part of this specification.

My invention relates to systems of electrical distribution, and although it is particularly adapted for lighting cars or trains it may be applied to other purposes.

In the lighting of cars by electricity a system has been employed wherein the current for operating the lamps and other translating devices is furnished from a generator which derives its power from the motion of the car and also from a storage battery which receives its charging current from the generator, said generator being regulated by means of a suitable automatic regulator to confine the voltage developed thereby within certain limits. The current which the generator must deliver to charge the battery and operate the translating devices depends upon the number of translating devices in operation, for when the number of said translating devices in operation changes the current consumed thereby varies. Therefore, to insure sufficient current being delivered to the battery to charge the same, the generator output must be varied when the current consumed by the translating devices varies.

The object of the present invention is to provide a system of car lighting wherein the regulator will not interfere with the ability of the generator to vary its output upon variations in the demands for current by the translating devices.

In accordance with the present invention in its preferred form, the regulator has its action controlled by the resultant action of differentially acting electro-magnetic windings which are connected in different circuits in which equal variations occur in the currents flowing therethrough when the output of the generator varies upon variations in the demands for current.

The regulator contemplated by this invention may be of any form so far as the ultimate results are concerned. In the preferred embodiment of the present invention, however, the regulation of the generator is effected through the agency of a counter electro-motive force device which introduces a counter electro-motive force into the field circuit of the generator to oppose the current tending to flow therethrough and thus reduce the energizing current in said field as the speed of the generator increases. In this manner the output of the generator is confined within certain limits regardless of changes in the speed of the generator.

A system which will serve to illustrate the principal features of the present invention is shown in the accompanying drawing, but while one embodiment of the invention has been selected for the purpose of illustration, it will be understood that the invention may be embodied in various other ways.

The system of car lighting illustrated in the drawings employs a generator having an armature 1 and a field 2, said armature being geared to an axle or in any other way arranged so as to derive its power from the motion of the car. From this generator current is delivered through the supply circuit having mains 3 and 4 to the battery 5 connected in the battery circuit extending across said mains and also to the translating devices 6 arranged in parallel in the translating circuit 7—7 which is connected with the supply circuit, said translating circuit preferably being controlled by a switch 8.

The supply circuit may be controlled by an automatic switch which may consist of stationary contacts 9, 9 and a movable contact 10 carried by a plunger 11, said plunger being operated by a solenoid 12 of fine wire connected in a shunt across the supply circuit. When the automatic switch is closed a solenoid 13 of coarse wire connected in series with the switch contacts in the supply circuit supplements the action of the shunt solenoid to effect closer engagement between the switch contacts as the current flowing across the switch from the generator increases. The automatic switch is closed by the shunt solenoid when the generator in starting develops a certain voltage, and then the switch being closed, the series solenoid becomes energized. As long as the generator voltage remains in excess of the battery voltage, the series solenoid is energized by current from the generator, and then the two solenoids act conjointly in keeping the switch closed, but when the generator voltage falls below the battery voltage, the series solenoid becomes energized by current from the battery flowing backward therethrough, and then as the two solenoids oppose each other, due to the reversal of the polarity of the series solenoid, the switch opens and stops the discharge of the battery through the generator.

The generator may be regulated to confine the voltage developed thereby within safe and certain limits by a counter electro-motive force device having an armature 13 connected in series with the field 2 of the generator, and a field or controlling magnet composed of windings 14 and 15, said armature preferably being driven in starting by a shunt wound motor connected across the mains of the supply circuit and having an armature 16 and a field 17.

When the generator is operative, the field of the counter electro-motive force device will be excited by current flowing through the field windings 14, 15, and the armature 13 of said device will run at substantially constant speed, said armature having been started by the motor which receives the current for operating the same from the generator. The field strength of the counter electro-motive force device will increase as the speed and consequently the voltage of the generator increases, and inasmuch as this will cause the counter electro-motive force created in the field circuit of the generator by the armature 13 to increase, the energizing current for the field of said generator will be reduced, and consequently the field will be weakened. As the field strength of the generator thus varies approximately inversely as the speed of the generator varies, the output of the generator will remain within certain and safe limits, notwithstanding the extent to which the speed of the generator may rise.

The field windings 14 and 15 are adapted to act differentially with respect to each other, the former being subjected to the entire current flowing through the supply circuit to the translating devices and the battery, and the latter being merely subjected to the current flowing through the translating circuit to the translating devices. Therefore the counter electro-motive force device will not interfere with the ability of the generator to vary its output upon variations in the demands for current caused by changing the number of translating devices in operation, as when the output of the generator varies, the increase in the currents flowing through said field windings will not affect the resultant effect of said windings.

Inasmuch as the generator may vary its output in accordance with the variations in the current consumed by the translating devices, the battery current will remain substantially constant at constant speed of the generator notwithstanding the current that may be consumed by the translating devices, that is if the generator be delivering 35 amperes and the translating devices be consuming 20 amperes, thus leaving 15 amperes for charging the battery, then upon an increase in the current consumed by the translating devices to 35 amperes, the total output of the generator would increase to 50 amperes while the current for charging the battery would remain 15 amperes.

The counter electro-motive force device may be rendered inoperative, when the battery sends current through the field windings thereof and its armature is being driven by the motor, by means of a polarized switch provided with magnets 18, 18 having windings 19, 19 and a polarized bar or armature 20 pivoted upon a suitable support. The bar 20 carries a bridge 21 having a flexible electrical connection 22 with the battery circuit and adapted to engage stationary contacts 23 and 24, said contacts being connected with conductors 25 and 26 respectively of a shunt extending around the field windings 14 and 15 of the counter electro-motive force device. The polarized switch will be operated to close the shunt 25—26 by current flowing from the battery and through the windings 19, 19 when the generator runs at a low speed. As the field windings 14 and 15 will then be short-circuited, the counter electro-motive force device will be inoperative. With the polarized switch closed, current from the battery will flow from the positive terminal of the battery through conductor 7, translating devices 6, conductor 7, conductor 25, contact 23, brush 21, connection 22, and windings 19, 19, to the negative terminal of the battery, and current will also flow from the positive terminal of the generator through the automatic switch, switch 8, conductor 7, translating devices 6, conductor 7, conductor 25, contact 23, bridge 21, contact 24, conductor 26, and main 4, to the negative terminal of the generator. The polarized switch will open the shunt 25—26 when the generator runs at sufficient speed to develop a voltage which will reverse the current flowing in the battery circuit and send the current through the battery.

While the car is at rest the translating devices may be operated by the battery 5. Upon starting the car the automatic switch will close when the generator develops, for instance, 64 volts. As long as the voltage developed by the generator and that of the storage battery are substantially equal, the generator and the battery will coöperate in supplying the current for operating the translating devices, but when the voltage developed by the generator rises higher than the voltage of the battery, the generator will supply the current for charging the battery as well as for operating the translating devices.

Assuming that when the car runs at about 20 miles per hour the generator runs at 500 revolutions per minute and develops 64 volts, then when the car runs at about 60 miles per hour provided all other connections remain the same, the generator would run at about 1500 revolutions per minute and would develop about 192 volts if its field were not weakened by the counter electro-motive force device to such an extent that the voltage remains within safe limits. It is sufficient to have the generator develop 80 volts at the maximum speed of the car, as this would be approximately 2½ volts per cell, which is ample to force the full charging current through the battery, where the battery contains 32 cells each having a normal voltage of 2 volts. Accordingly, the generator is preferably regulated by the counter electro-motive force device to allow a variation in the voltage thereof from 64 to 80 volts while the speed of the generator varies from about 500 revolutions per minute at a car speed of 20 miles per hour to 1500 revolutions per minute at a car speed of about 60 miles per hour.

It will be understood that certain features of my invention are applicable to various purposes and may be used in different relations.

It is manifest that many changes may be made in the system illustrated in this application which will be within the purview of the claims appended hereto.

Having thus described my invention, what I claim as new and desire to secure by Letters Patent is:—

1. In combination, a generator, a supply circuit connected therewith, a battery circuit containing a storage battery and a translating circuit containing translating devices connected with said supply circuit, a regulator adapted to regulate said generator and having electromagnetic windings controlling the operation thereof, one of said windings being connected in said supply circuit and the other in said translating circuit, and means for rendering said regulator inoperative whenever said generator and said storage battery conjointly furnish the current to operate said translating devices.

2. In combination, a generator, a supply circuit connected therewith, a battery circuit containing a storage battery and a translating circuit containing translating devices connected with said supply circuit, and a regulator adapted to regulate said generator and having electromagnetic windings controlling the operation thereof, one of said windings being connected in said supply circuit and the other in said translating circuit, said windings being adapted to act differentially, and means for rendering said regulator inoperative whenever said generator and said storage battery conjointly furnish the current to operate said translating devices.

3. In combination, a generator, a supply circuit connected therewith, a battery circuit containing a storage battery and a translating circuit containing translating devices connected with said supply circuit, a regulator adapted to regulate said generator and having electro-magnetic windings controlling the operation thereof, one of said windings being connected in said supply circuit and the other in said translating circuit, and an automatic switch adapted to render said regulator inoperative whenever said generator and said storage battery conjointly furnish the current to operate said translating devices.

4. In combination, a generator, a supply circuit connected therewith, a battery circuit containing a storage battery and a translating circuit containing translating devices connected with said supply circuit, and a regulator adapted to regulate the generator and having electro-magnetic windings controlling the operation thereof, one of said windings being connected in said supply circuit and the other in said translating circuit, and a polarized switch connected in said battery circuit and adapted to render said regulator inoperative whenever said generator and said storage battery conjointly furnish the current to operate said translating devices.

5. In combination, a generator, a supply circuit connected therewith, a battery circuit containing a storage battery and a translating circuit containing translating devices connected with said supply circuit, a regulator adapted to regulate said generator and having electro-magnetic windings controlling the operation thereof, one of said windings being connected in said supply circuit and the other in said translating circuit, and a switch adapted to short circuit said windings whenever said generator and said storage battery conjointly furnish the current to operate said translating devices.

6. In combination, a generator, a supply circuit connected therewith, a battery circuit containing a storage battery and a translating circuit containing translating devices connected with said supply circuit, and a regulator adapted to regulate the generator and having electro-magnetic windings controlling the operation thereof, one of said windings being connected in said supply circuit and the other in said translating circuit, a shunt extending around said windings, and a switch adapted to close said shunt when the battery discharges current and connect said battery circuit with said shunt whenever said generator and said storage battery conjointly furnish the current to operate said translating devices.

7. In combination, a generator, a supply circuit connected therewith, a battery circuit containing a storage battery and a translating circuit containing translating devices connected with said supply circuit, a regulator for said generator having electro-magnetic windings controlling the operation thereof, one of said windings being connected in said supply circuit and the other in said translating circuit, a shunt extending around said windings, and a polarized switch connected in said battery circuit and adapted to close said shunt and connect said battery circuit therewith whenever said generator and said storage battery conjointly furnish the current to operate said translating devices.

8. In a system of electrical distribution, in combination, a generator, a main circuit extending therefrom, a storage battery arranged in one parallel branch of said main circuit, translating devices arranged in another parallel branch of said main circuit, a dynamo electric machine adapted to modify electrical conditions in said system, electro-magnetic windings for controlling the action of said dynamo electric machine, one of said windings being connected in said main circuit and the other in the translating circuit, and means for rendering said dynamo electric machine inactive whenever said generator and said storage battery conjointly furnish the current to operate said translating devices.

9. In a system of electrical distribution, in combination, a generator, a main circuit, a storage battery arranged in one parallel branch of said main circuit, translating devices arranged in another parallel branch of said main circuit, a dynamo electric regulator adapted to modify the electrical conditions in said system, differentially acting electro-magnetic windings for controlling the action of said regulator, one of said windings being connected in said supply circuit and the other in said translating circuit, and a means for rendering said regulator inoperative whenever said generator and said storage battery conjointly furnish the current to operate said translating devices.

10. In a system of electrical distribution, in combination, a generator driven at a variable speed, a main circuit extending therefrom, a storage battery arranged in one parallel branch of said main circuit, translating devices arranged in another parallel branch of said main circuit, a dynamo electric regulator for regulating said generator to confine the output thereof within prearranged limits, differentially acting electro-magnetic windings for controlling the action of said regulator, one of said windings being connected in said main circuit and the other in said translating circuit and a means for rendering said regulator inoperative whenever said generator and said storage battery conjointly furnish the current to operate said translating devices.

11. In combination, a generator, a supply circuit connected therewith, a battery circuit containing a storage battery and a translating circuit containing translating devices connected with said supply circuit, a counter electro-motive force device adapted to regulate the generator and having a field winding connected in said supply circuit and another field winding connected in said translating circuit, and means for rendering said device inoperative whenever said generator and said storage battery conjointly furnish the current to operate said translating devices.

12. In combination, a generator, a supply circuit connected therewith, a battery circuit containing a storage battery and a translating circuit containing translating devices connected with said supply circuit, a counter electro-motive force device having a field winding connected in said supply circuit and another field winding connected in said translating circuit, said windings being adapted to act differentially, and means adapted to render said counter electro-motive force devices inoperative when the battery discharges.

13. In combination, a generator, a supply circuit connected therewith, a battery circuit containing a storage battery and a translating circuit containing translating devices connected with said supply circuit, a counter electro-motive force device having a field winding connected in said supply circuit and another field winding connected in said translating circuit, and a switch adapted to render said counter electro-motive force device inoperative when the battery discharges.

14. In combination, a generator, a supply circuit connected therewith, a battery circuit containing a storage battery and a translating circuit containing translating devices connected with said supply circuit, a counter electro-motive force device having a field winding connected in said supply circuit and another field winding connected in said translating circuit, and a polarized switch connected with said battery circuit and adapted to render said device inoperative when the battery discharges.

15. In combination, a generator, a supply circuit connected therewith, a battery circuit containing a storage battery and a translating circuit containing translating devices connected with said supply circuit, a counter electro-motive force device having a field winding connected in said supply circuit and another field winding connected in said translating circuit, a shunt extending around said windings, and a switch adapted to close said shunt when the battery discharges.

16. In combination, a generator, a supply circuit connected therewith, a battery circuit containing a storage battery and a translating circuit containing translating devices connected with said supply circuit, a counter electro-motive force device having a field winding connected in said supply circuit and another field winding connected in said translating circuit, a shunt extending around said windings, and a switch adapted to close said shunt and connect said battery circuit therewith when the battery discharges.

17. In combination, a generator, a supply circuit connected therewith, a battery circuit containing a storage battery and a translating circuit containing translating devices connected with said supply circuit, a counter electro-motive force device having a field winding connected in said supply circuit and another field winding connected in said translating circuit, a shunt extending around said windings, and a polarized switch connected with said battery circuit and adapted to close said shunt and connect the battery circuit therewith when the battery discharges.

18. In combination, a generator, a supply circuit connected therewith, a battery circuit containing a storage battery and a translating circuit containing translating devices connected with said supply circuit, a counter electro-motive force device having a field winding connected in said supply circuit and another field winding connected in said translating circuit, and means adapted to render said device inoperative when the generator runs at low speed.

19. In combination, a generator, a supply circuit connected therewith, a battery circuit containing a storage battery and a translating circuit containing translating devices connected with said supply circuit, a counter electro-motive force device adapted to vary the field strength of said generator and having a field winding connected in said supply circuit and another field winding connected in said translating circuit, a motor adapted to operate said counter electro-motive force device, and means adapted to render said device inoperative when the battery discharges current.

20. In a system of electrical distribution in combination, a source of electrical energy, a main circuit extending therefrom, a storage battery arranged in one parallel branch of said main circuit, translating devices arranged in another parallel branch of said main circuit, electro-magnetic windings adapted to control the electrical conditions in said system, one of said windings being connected in said main circuit and the other in the translating circuit, and a means for obviating the action of said windings whenever said generator and said storage battery conjointly furnish the current to operate said translating devices.

21. In a system of electrical distribution, in combination, a source of electrical energy, a main circuit connected thereto, a storage battery arranged in one parallel branch of said main circuit, translating devices arranged in another parallel branch of said main circuit, a regulator, electro-magnetic windings for controlling the action of said regulator, one of said windings being connected in said main circuit and the other in the translating circuit, and means for obviating the action of said regulator whenever said generator and said storage battery conjointly furnish the current to operate said translating devices.

22. In a system of electrical distribution, in combination, a source of electrical energy, a main circuit connected thereto, a storage battery arranged in one parallel branch of said main circuit, translating devices arranged in another parallel branch of said main circuit, a regulator adapted to control the electrical conditions in said system, differentially acting electro-magnetic windings for controlling the action of said regulator, one of said windings being connected in said main circuit and the other in the translating circuit, and means for rendering said regulator inoperative whenever said generator and said storage battery conjointly furnish the current to operate said translating devices.

In witness whereof, I have hereunto subscribed my name in the presence of two witnesses.

WILLIAM L. BLISS.

Witnesses:
EDWIN B. H. TOWER, Jr.,
C. B. C. FOWLER.